(12) United States Patent
Kondo et al.

(10) Patent No.: US 6,558,032 B2
(45) Date of Patent: May 6, 2003

(54) LED LIGHTING EQUIPMENT FOR VEHICLE

(75) Inventors: Toshiyuki Kondo, Tokyo (JP); Hidetaka Okada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/939,264

(22) Filed: Aug. 24, 2001

(65) Prior Publication Data

US 2002/0024818 A1 Feb. 28, 2002

(30) Foreign Application Priority Data

Aug. 25, 2000 (JP) ........................................ 2000-255615

(51) Int. Cl.$^7$ ................................................ F21V 5/00
(52) U.S. Cl. ........................ 362/516; 362/346; 362/517; 362/303; 362/305
(58) Field of Search ................................ 362/299, 303, 362/305, 346, 517, 516

(56) References Cited

U.S. PATENT DOCUMENTS

| | | | | |
|---|---|---|---|---|
| 4,814,950 A | * | 3/1989 | Nakata | 362/61 |
| 5,639,153 A | * | 6/1997 | Bibbiani et al. | 362/32 |
| 5,967,647 A | * | 10/1999 | Eichler | 362/304 |
| 6,129,447 A | * | 10/2000 | Futami | 362/522 |
| 6,270,241 B1 | * | 8/2001 | Collot et al. | 362/544 |
| 6,334,700 B2 | * | 1/2002 | Ramer et al. | 362/298 |
| 6,402,356 B2 | * | 6/2002 | Gotou | 362/543 |
| 6,485,170 B2 | * | 11/2002 | Natsume | 362/509 |
| 6,502,964 B1 | * | 1/2003 | Simon | 362/328 |

* cited by examiner

*Primary Examiner*—Sandra O'Shea
*Assistant Examiner*—Anabel Ton
(74) *Attorney, Agent, or Firm*—Weingarten, Schurgin, Gagnebin & Lebovici LLP

(57) ABSTRACT

In the conventional lighting equipment for vehicle using LED lamp, as the LED lamp irradiation angle is narrow, an optical irregularity making the luminescent surface spotted is generated, resulting in a feeling of wrongness of the viewer. Means to Solve the Problem. A LED lighting equipment 1 for vehicle of the present invention, comprising at least one light emitting unit 3 wherein an LED lamp 2 is disposed approximately at the focus of one hyperboloid, a reflection surface of hyperboloid 4 defined by the other hyperboloid comprising a transmission portion 4a disposed in an appropriate range near the optical axis is arranged in the LED lamp 2 optical axial direction, and a refection surface of paraboloid of revolution 5 having the approximate focus at the focus of said the other hyperboloid focus is arranged at the side of said LED lamp 2, allows to enlarge the irradiation angle at the reflection surface of hyperboloid 4, and to emit light in a larger area.

16 Claims, 3 Drawing Sheets

LED LIGHTING EQUIPMENT FOR VEHICLE

BACKGROUND OF THE INVENTION

1. Field of the Invention

The present invention relates to a composition of a lighting equipment for vehicle adopting one or a plurality of LED lamps as light source, and more precisely, has an object to provide a composition allowing to prevent irregular brightness over the light emitting surface that appears frequently when the LED lamp is adopted as light source from occurring.

2. Detailed Description of the Prior Art

FIG. 6 shown an example of composition of a conventional LED lighting equipment 90 for vehicle, wherein an LED lamp 92 is fitted to each of individual reflector portion 91a, of a base plate 91 where a plurality of reflector portions 91 for example as surface of paraboloid of rotation are formed, and further, the front of said LED lamp 92 is covered with a lens 93 provided with a lens cut 93a corresponding to each of individual reflector portion 91a.

In such a composition, the direct light from the LED lamp 92 and the light reflected from said reflector portion 91a are incident to said lens cut 93a and, it is expected that the whole surface of the lens 93 shines with an approximately even brightness by the effect of the lens cut 93a for diffusing these light conveniently.

However, in the LED lighting equipment 90 for vehicle of said conventional composition, the adopted LED lamp 92 is, for instance, a LED chip of 0.3 mm square that can substantially taken as a point light source, covered with a resin lens serving also as case and, there, as said resin lens is formed in a convex lens having its focus near the LED chip, the light emitted from the LED lamp 92 is highly converged, presenting a narrow irradiation angle (for instance 30° to 50° in half value of the brightness).

Therefore, light attains rarely to said reflector portion 91a and, substantially, only the direct light from the LED lamp 92 passes through the lens 93 and reaches at the viewer, and a luminescence irregularity appears over the light emitting surface (namely on the lens 93 surface) as shown in FIG. 7, deteriorating the appearance.

In order to solve this problem, the radiation angle of respective LED lamps 92 may be overlapped each other, by reducing the LED lamp 92 arrangement distance, or increasing the depth of the LED lighting equipment for vehicle; however, if the distance is reduced, the necessary number of LED lamps 92 for the same light emitting surface, resulting in increase of cost, power consumption, temperature when turned on, or other problems, and if the depth is increased, the size also increasing, making difficult to load on a vehicle and causing other new problems.

SUMMARY OF THE INVENTION

The present invention solves the problems by providing, as a concrete means for solving the aforementioned conventional problems, a LED lighting equipment for vehicle, comprising at least one light emitting unit wherein an LED lamp is disposed approximately at the focus of one hyperboloid, a reflection surface of hyperboloid defined by the other hyperboloid comprising a transmission portion disposed in an appropriate range near an optical axis is arranged in the LED lamp optical axial direction, and a refection surface of paraboloid of revolution having the approximate focus at the focus of said the other hyperboloid focus is arranged at the side of said LED lamp.

DETAILD DESCRIPTION OF THE PREFERRED EMBODIMENT

Figure 1:
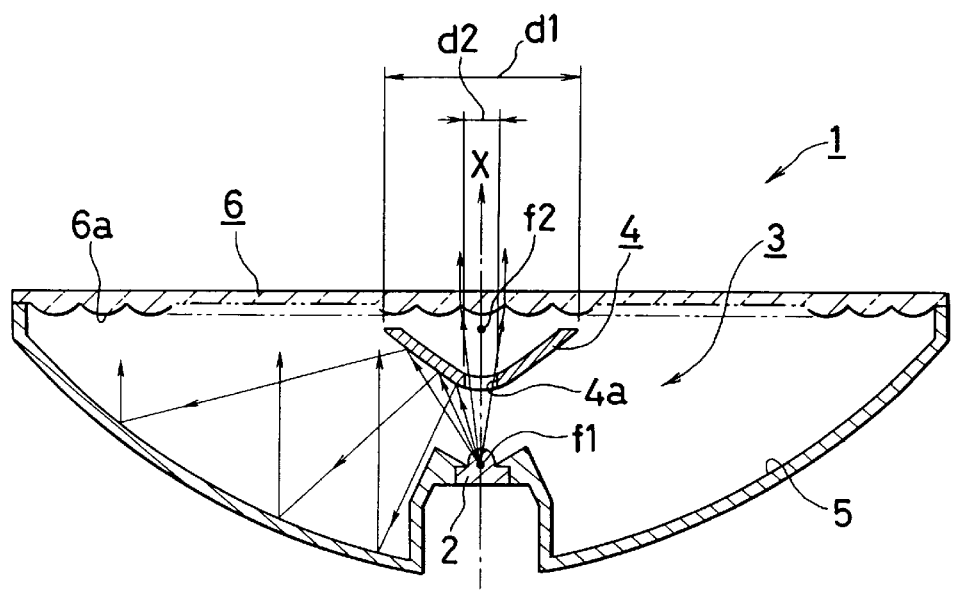
FIG. 1 is a cross section showing a first embodiment of the LED lighting equipment for vehicle according to the present invention.

Now, the present invention will be described in detail, based on the embodiment shown in the drawing. In FIG. 1, the symbol 1 indicates a first embodiment of a lighting equipment for vehicle according to the present invention, adopting an LED lamp 2 as in the prior art; however, in this invention, the LED lamp 2 is provide with a light emitting unit 3.

Said light emitting unit 3 comprises, as main components, a reflection surface of hyperboloid 4 having a transmission portion, and a reflection surface of paraboloid of revolution 5 4, and said LED lamp 2 is disposed at a predetermined position in respect to said reflection surface of hyperboloid 4.

Figure 2:
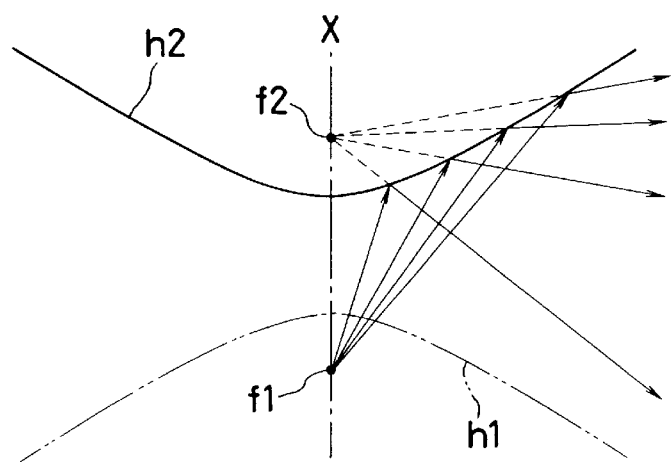
FIG. 2 illustrates the characteristics of hyperbola.

Before describing the lighting equipment for vehicle 1 of the present invention, the properties of hyperbola will be explained briefly. As shown in FIG. 2, a pair of hyperbolae h1, h2 facing each other have respectively foci f1, f2. A hyperboloid of two sheets facing each other with both convex faces is obtained by the rotation of the hyperbolae h1, h2 around an axis X passing through said two foci f1, f2. General formula of a hyperboloid of two sheets are defined as follows:

$$x/a + y/b - Z/c = -1$$

Here, if a point light source is disposed at the focus f1 of one hyperbola h1 when any one hyperboloid, for instance only the hyperboloid formed by the other hyperbola f2 exits, the hyperboloid formed by the other hyperbola h2 generates a reflection light as if light is radiated from the focus f2. However, as the hyperboloid is convex, the radiation angle is enlarged than in case of radiation from the focus f1.

In the present invention, the reflection surface of hyperboloid 4 of the composition mentioned above is used and, referring again to FIG. 1, said LED lamp 2 is placed at the position of the focus f1 of one hyperbola h1. And, said reflection surface of hyperboloid 4 is the other hyperboloid of two sheets defined by the other hyperbola h2.

On the other hand, said refection surface of paraboloid of revolution 5 has the focus 2 of said other hyperbola h2 as focus. Therefore, light from a virtual light source existing at the focus f2 is reflected as parallel light in the irradiation direction X of the LED lighting equipment for vehicle 1. Here, the virtual light source existing at said focus f2 is generated, as mentioned above, by the LED lamp 2 disposed at the focus f1 and, as a result, the refection surface of paraboloid of revolution 5 direct the light from the LED lamp 2 disposed at the focus f1 to the irradiation direction X.

Now, the transmission portion 4a disposed on the reflection surface of hyperboloid 4 will be explained; this transmission portion 4a transmits the light from the LED lamp 2 to the irradiation direction X, without reflecting. This is because said refection surface of paraboloid of revolution 5 reflects the light from the reflection surface of hyperboloid 4 as parallel light parallel to the irradiation direction X, and the reflected light enters again the reflection surface of hyperboloid 4 in a portion behind the reflection surface of hyperboloid 4 and, as a result, shielded by the reflection surface of hyperboloid 4 and can not be used as reflected light.

Consequently, the diameter d2 of said transmission portion 4a is defined according to the diameter d1 of the reflection surface of hyperboloid 4, in short, when the light radiated from the LED lamp 2 and reflected by the reflection surface of hyperboloid 4 attains the refection surface of paraboloid of revolution 5, the portion constituting a range narrower than the diameter d1 of the reflection surface of hyperboloid 4 e.g. a portion in the vicinity of vertex of a hyperboloid 4 can be the transmission 4a and radiate directly in the irradiation direction X, preventing the loss of light amount.

As for a concrete method for forming said transmission portion 4a, when said reflection surface of hyperboloid 4 is made of metal plate or other opaque member, a hole of a predetermined diameter may be opened at a predetermined position, and when it is made of resin or other transparent member, reflection treatment such as aluminum vacuum deposition may be applied except for the transmission portion 4a.

Thus, a lens 6 provided with a convenient lens cut 6a is disposed in front of the light directed to the irradiation direction X from said refection surface of paraboloid of revolution 5 and the transmission portion 4a of the reflection surface of hyperboloid 4, and light distribution characteristics as LED lighting equipment for vehicle 1 can be obtained by affording a convenient divergence to both lights from he reflection surface of the paraboloid of revolution 5 and the transmission portion 4a.

In the foregoing, one light emitting unit 3 in the LED lighting equipment for vehicle 1 has been described; however, the present invention is not limited to dispose one light emitting unit 3 for one LED lighting equipment for vehicle 1, a plurality of light emitting units 3 may be disposed for a single LED lighting equipment for vehicle 1.

Now, the functions and effects of the LED lighting equipment for vehicle 1 of the present invention having the aforementioned composition. In the composition of the present invention, as light from the LED lamp 2 is once reflected by the reflection surface of hyperboloid 4 and then received by the refection surface of paraboloid of revolution 5 and directed as parallel light in the irradiation direction X, allowing to enlarge a narrow irradiation angle of the LED lamp 2.

Therefore, light having an enlarged irradiation angle is incident to said refection surface of paraboloid of revolution 5, thereby eliminating dot luminescence that has been produced when the LED lamp 2 was adopted as light source in the prior art, and removing irregular brightness that has been produced on the luminescent surface of the lighting equipment 1.

Figure 3:
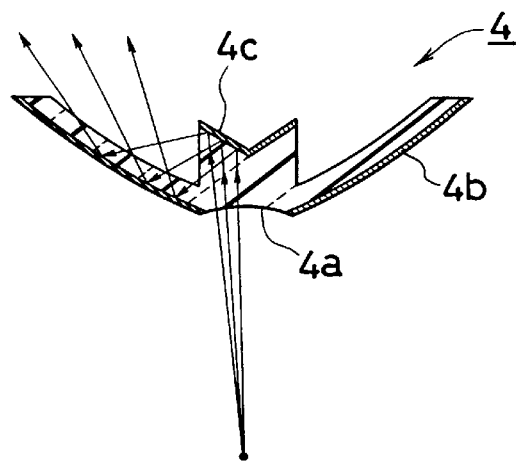
FIG. 3 is a cross section showing essential parts of a second embodiment of the LED lighting equipment for vehicle also according to the present invention.

FIG. 3 shows a second embodiment of the present invention, and this second embodiment concerns said reflection surface of hyperboloid 4. In the general characteristics of the LED lamp 2, light amount directed in the irradiation direction X is overwhelmingly important, and it is expected that the light amount passing through the transmission portion 4a is considerably high, though the aforementioned transmission portion 4a is small in diameter.

Consequently, it is preferable to diverge the light passing through said transmission portion 4a over an area as large as possible, for taking the balance of brightness with the other portions such as refection surface of paraboloid of revolution 5; therefore, in this second embodiment, a full reflection surface 4c made, for instance, in a substantially conical form, is provided on the optical path from said transmission portion 4a and light is reflected on the back of the reflection surface of hyperboloid 4 to enhance the divergence. Here, in this second embodiment, the reflection surface of hyperboloid 4 is formed with transparent resin or the like.

Figure 4:
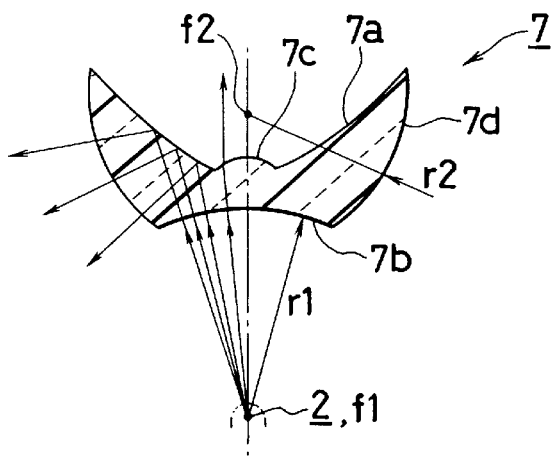
FIG. 4 is a cross section showing essential parts of a third embodiment of the LED lighting equipment for vehicle also according to the present invention.

FIG. 4 shows essential parts of a third embodiment of the LED lighting equipment for vehicle according to the present invention. In the foregoing second embodiment, the reflection surface of hyperboloid 4 was described as the one wherein the basic form of the reflection surface of hyperboloid 4 is made of metal, or, transparent, opaque resin member or the like, and the portion to constitute the reflection surface is reflection treated 4b by aluminum vacuum deposition or others.

In opposition, the reflection surface of hyperboloid 7 of this third embodiment, the function of full reflection generating at the interface in a transparent resin at the critical angle produced by the difference of the transparent resin refractive index and the atmospheric refractive index is used and, in this embodiment, the hyperboloid 7a is formed at the interface with the atmosphere at the back of the transparent member viewed from the LED lamp 2.

The convenient range for the incident position of the light from the LED lamp 2 is made as an arc r1 surface around the first focus f1 or a plane, to form a transmission portion incidence portion 7b, and the back portion corresponding to said transmission portion incidence portion 7b is made as a convenient convex lens shape or others, to form a transmission portion exit portion 7c. Here, the diameter of the transmission portion exit portion 7c is decided similarly to the foregoing first embodiment.

A face 7d at the LED lamp 2 side which is the thickness direction of the reflection surface of hyperboloid 7a is made, for instance, as an arc r2 surface around the second focus f2 not to impart basically change to the progression direction of the reflection light from the hyperboloid 7a, and not to impair the function of obtaining parallel light by the reflection from the following refection surface of paraboloid of revolution 5 (not shown); however, the modification thereof is possible, and the face 7d made as a convenient convex surface such that light rays are diverged at the time point when the reflection is realized by the refection surface of paraboloid of revolution 5, and the lens cut 6a to be applied to the lens 6 can be reduced, to improve the transparence as the whole LED lighting equipment for vehicle 1. The face 7d may include any prismatic cuts.

Now the function and effect of this third embodiment will be described; it is unnecessary to apply mirror surface treatment to the hyperboloid 7a by aluminum vacuum deposition. In the aforementioned first embodiment, the formation of the reflection surface of hyperboloid 4 with transparent resin member required complex operation such as masking for securing the transmission portion 4a; therefore the exemption of mirror surface treatment reduces the number of man-hour, present an evident effect.

Figure 5:
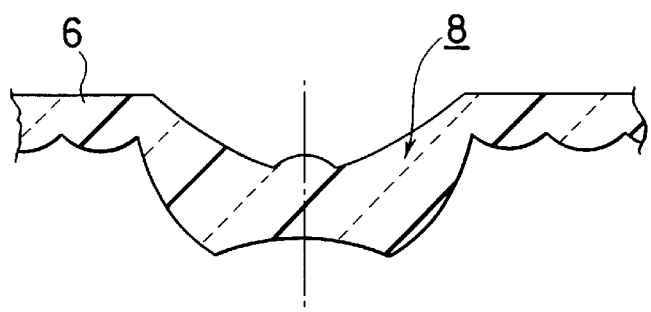
FIG. 5 is a cross section showing essential parts of a fourth embodiment of the LED lighting equipment for vehicle also according to the present invention.
Figure 6:
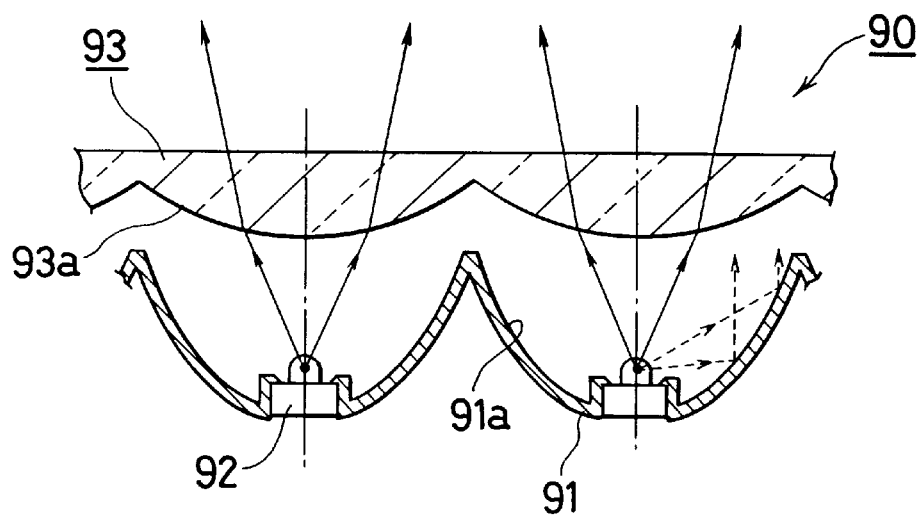
FIG. 6 is a cross section showing an example of the prior art.
Figure 7:
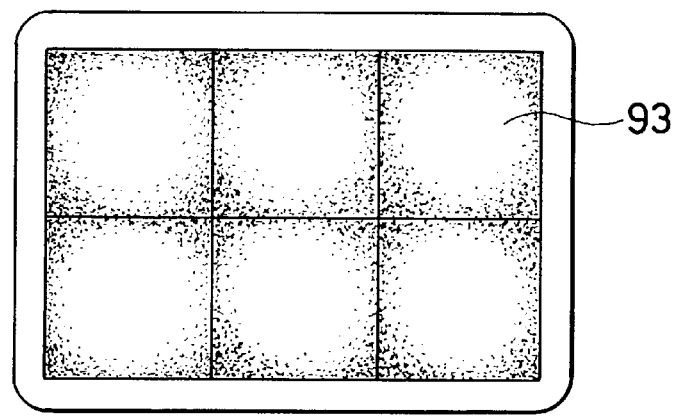
FIG. 7 illustrate the luminescence state of the example of the prior art.

FIG. 5 shows the fourth embodiment of the present invention and, in this fourth embodiment, the reflection surface of hyperboloid 8 is formed integrally with the lens 6. Such integration allows to omit the mounting process of the reflection surface of hyperboloid 8 and, especially, in case where a plurality of LED lamps 2 are adopted as light source for the LED lighting equipment for vehicle 1, making unnecessary the number of man-hour for adjusting the position of the reflection surface of hyperboloid 8 for each of individual LED lamp 2, allowing to reduce further the number of man-hour. In addition, the fourth embodiment can make its effect further evident by using with the third embodiment where the mirror surface treatment is unnecessary.

As described above, the LED lighting equipment for vehicle of the present invention, comprising at least one light emitting unit wherein an LED lamp is disposed approximately at the focus of one hyperboloid, a reflection surface of hyperboloid defined by the other hyperboloid comprising a transmission portion disposed in an appropriate range near the optical axis is arranged in the LED lamp optical axial direction, and a refection surface of paraboloid of revolution having the approximate focus at the focus of said the other hyperboloid focus is arranged at the side of said LED lamp, allows to enlarge the irradiation angle of the LED lamp in a state where the focus of the one hyperboloid i.e. the LED lamp is located by reflecting the light from the LED lamp presenting a narrow irradiation angle by the reflection surface of the other hyperboloid, and to illuminate a larger area with the light from a single LED lamp, by reflecting this light whose irradiation angle is enlarged in the irradiation direction by the refection surface of paraboloid of revolution, thereby, solving the irregular brightness produced on the luminescent surface of this kind of LED lighting equipment for vehicle and deploying extremely excellent effects for improving the performance.

What is claimed is:

1. A lighting equipment for vehicle, comprising at least one light emitting unit, the light emitting unity having an optical axis comprising:
   a first reflection unit comprising a hyperbolic reflecting surface having a first focus on the optical axis and a light transmission portion in the vicinity of the optical axis;
   a second reflecting surface of paraboloid of revolution having a second focus approximately at the first focus of the hyperbolic reflecting surface for reflecting light rays from the first reflecting surface to an irradiation direction of the light emitting unit; and
   a light source oriented to face to the light transmission portion and located on the optical axis symmetrically with the first focus about an axis orthogonal to the optical axis.

2. The lighting equipment for vehicle of claim 1, wherein the hyperbolic reflecting surface reflects light from the light source at a critical angle.

3. The lighting equipment for vehicle of claim 1, wherein the light transmission portion of the first reflection unit is located in a range larger than a re-entry portion of the hyperbolic reflecting surface into which light first reflected by the re-entry portion of the hyperbolic reflecting surface re-enters the same after being reflected by the second reflecting surface, if the re-entry portion has a reflecting finish.

4. The light equipment for vehicle of claim 2, wherein the light transmission portion of the first reflection united is located in a range larger than a re-entry portion of the hyperbolic reflecting surface into which light first reflected by the re-entry portion of the hyperbolic reflecting surface re-enters the same after being reflected by the second reflecting surface, if the re-entry portion has a reflecting finish.

5. The lighting equipment for vehicle of claim 1, wherein the light transmission portion has a curved surface having an arc with a center approximately on the pseudo-focus.

6. The lighting equipment for vehicle of claim 3, wherein the light transmission portion has a curved surface having an arc a center approximately on the pseudo-focus.

7. The light equipment for vehicle of claim 1, wherein the first reflection unit comprises a curved surface having an arc with a center approximately on the first focus.

8. The lighting equipment for vehicle of claim 2, wherein the first reflection unit comprises a curved surface having an arc with a center approximately on the first focus.

9. The lighting equipment for vehicle of claim 1, wherein the light transmission portion has a plane portion.

10. The lighting equipment for vehicle of claim 3, wherein the light transmission portion has a plane portion.

11. The lighting equipment for vehicle of claim 1, wherein the first reflection unit has prismatic cuts for diverging directions of light rays after being reflected by the hyperbolic reflecting surface.

12. The lighting equipment for vehicle of claim 2, wherein the first reflection unit has prismatic cuts for diverging directions of light rays after being reflected by the hyperbolic reflecting surface.

13. The lighting equipment for vehicle of claim 1, wherein the light emitting unit comprises a front lens covering an aperture formed by the second reflecting surface, and the first reflection unit is formed integrally with the front lens.

14. The lighting equipment for vehicle of claim 1, wherein the first reflection unit comprises a total reflection surface corresponding to the light transmission portion for reflecting light rays to the hyperbolic reflecting surface.

15. The lighting equipment for vehicle of claim 3, wherein the first reflection unit comprises a total reflection surface corresponding to the light transmission portion for reflecting light rays to the hyperbolic reflecting surface.

16. The light equipment for vehicle of claim 1, wherein the light source is a LED.

* * * * *

UNITED STATES PATENT AND TRADEMARK OFFICE
CERTIFICATE OF CORRECTION

PATENT NO.    : 6,558,032 B2    Page 1 of 1
DATED         : May 6, 2003
INVENTOR(S)   : Toshiyuki Kondo et al.

It is certified that error appears in the above-identified patent and that said Letters Patent is hereby corrected as shown below:

<u>Column 6,</u>
Lines 9 and 22, "pseudo-focus" should read -- optical axis --.

Signed and Sealed this

Sixth Day of April, 2004

JON W. DUDAS
*Acting Director of the United States Patent and Trademark Office*